No. 696,458. Patented Apr. 1, 1902.
E. LEVEILLE.
COMBINED SPOKE FASTENER AND TIRE TIGHTENER.
(Application filed Aug. 24, 1901.)
(No Model.)

Witnesses
M. D. Blondel
Clarence Shaw

Inventor
E. Leveille.
By Munn & Co.
Attorneys

UNITED STATES PATENT OFFICE.

ENGER LEVEILLE, OF GRINDSTONE, MAINE.

COMBINED SPOKE-FASTENER AND TIRE-TIGHTENER.

SPECIFICATION forming part of Letters Patent No. 696,458, dated April 1, 1902.

Application filed August 24, 1901. Serial No. 73,120. (No model.)

*To all whom it may concern:*

Be it known that I, ENGER LEVEILLE, a citizen of the United States, residing at Grindstone, in the county of Penobscot and State of Maine, have invented a new and useful Combined Spoke-Fastener and Tire-Tightener, of which the following is a specification.

My invention is an improvement in spoke-fasteners and tire-tighteners, and has for its object to provide a simple and inexpensive device for adjustably connecting a spoke to the rim of a wheel and by which the wear may be taken up as the occasion requires.

Another feature of my improvement is to provide a washer which acts as a cushion, whereby the wear is automatically taken up and the noise incident to the wear of a spoke is avoided; and with these objects in view my improvement also consists in the peculiar construction and novel arrangement and combination, as will be fully described in the following specification, and pointed out in the claim, reference being had to the drawings, in which—

Figure 1:
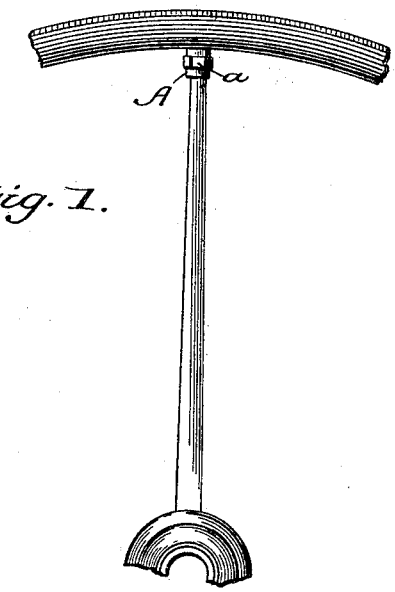
Figure 2:
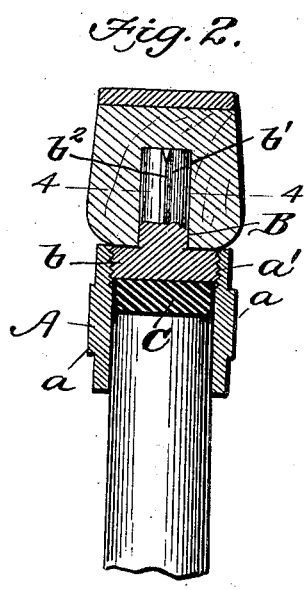
Figure 4:
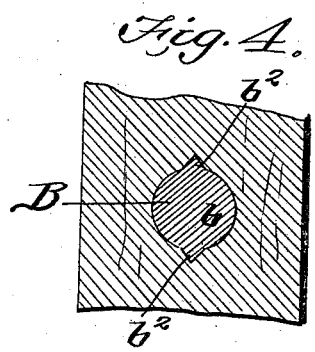
Figure 3:
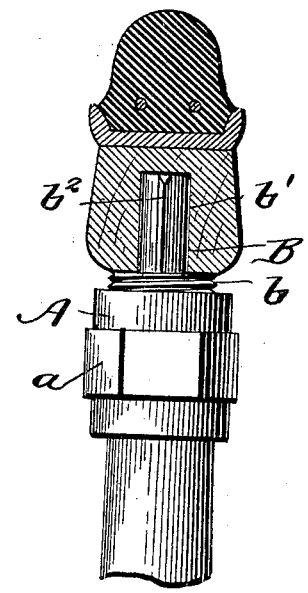
Figure 5:
Figure 7:
Figure 6:
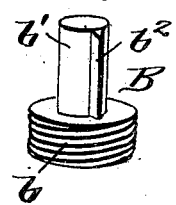

Figure 1 represents an elevation of a portion of a wheel constructed in accordance with my improvement. Fig. 2 is a detail transverse section of the same. Fig. 3 is a similar view of the tire of a wheel with my improvement shown in elevation and adjusted to take up the wear or fitted to a short spoke. Fig. 4 is a detail section taken about on the line 4 4 of Fig. 3, and Figs. 5, 6, and 7 are details of the several parts detached.

My invention is applicable to wheels of ordinary construction and may be readily applied thereto without requiring a great departure from the ordinary arrangements of parts; and it consists of a ferrule or thimble A, having a portion of its exterior provided with a wrench-surface, as shown at $a$, the interior of the ferrule being of the same bore throughout its entire length, with the upper portion terminating in screw-threads $a'$, that are adapted for engagement by the threaded lower end $b$ of a bolt B, the upper shank portion $b'$ of which being of a smaller diameter than the threaded end and has its surface provided with ribs $b^2$, the said reduced portion being adapted to fit a corresponding recess produced in the felly of the rim, the ribs being designed to prevent the bolt turning in the felly when the ferrule is being adjusted. The upper surface of the threaded portion forms a shoulder that rests against the inner surface of the felly, as shown. As before stated, the interior of the ferrule is of the same diameter and in the lower end of which the outer end of a spoke is fitted. A washer or cushion C, of rubber or other elastic material, is inserted within the ferrule between the end of the spoke and the bolt B, that is designed to form a cushion and prevent the rattling noise of the spoke when it becomes worn.

In applying my invention to a wheel it is only necessary to insert the reduced end in the felly and slip the ferrule over the end of the spoke. Then insert the cushion, and the device is ready to be screwed in position, which requires but a short time, and therefore saves much expense in the operation.

From the foregoing it will be seen that the device is exceedingly simple, consisting of only two parts besides the washer, and when a wheel is so equipped the slack or wear may be taken up without requiring the services of an experienced workman.

Having thus fully described my invention, what I claim as new, and desire to secure by Letters Patent, is—

In a device of the kind described, the combination of a felly having an opening formed therein, a bolt having a threaded portion and a reduced cylindrical shank extending therefrom that is adapted to fit within the opening in the felly, ribs formed upon the said reduced portion, a ferrule having a wrench-surface formed upon the exterior thereof, the interior of said ferrule having a bore of even diameter throughout its entire length and having one end terminating in a threaded portion, of a spoke adapted to fit within the said ferrule, and an elastic cushion interposed within the said ferrule between the end of the spoke and bolt, substantially as shown and described.

ENGER LEVEILLE.

Witnesses:
GEORGE W. STEARNS,
CLINTON E. STEVENS.